(No Model.)
T. W. JONES.
COLLAR OR CUFF BUTTON OR STUD.
No. 524,277. Patented Aug. 7, 1894.
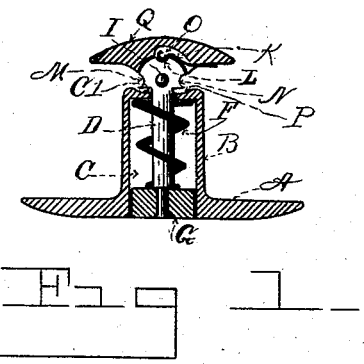
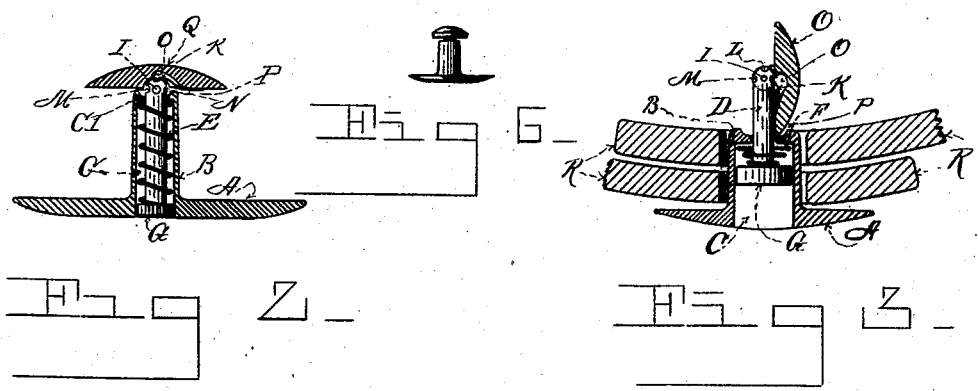
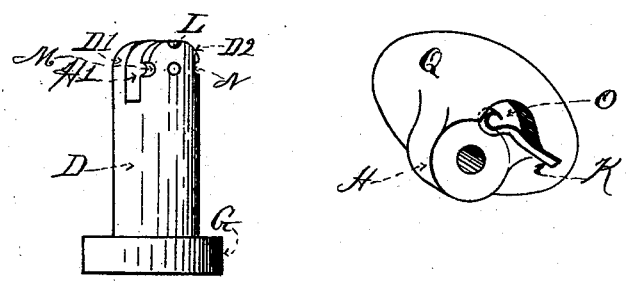
Witnesses
F. W. Tucker
Walter D. Burnham
Inventor
Thomas W. Jones
By his Attorney
Howard S. Bailey

United States Patent Office.

THOMAS W. JONES, OF DENVER, COLORADO.

COLLAR OR CUFF BUTTON OR STUD.

SPECIFICATION forming part of Letters Patent No. 524,277, dated August 7, 1894.

Application filed February 20, 1894. Serial No. 500,867. (No model.)

*To all whom it may concern:*

Be it known that I, THOMAS W. JONES, a citizen of the United States of America, residing at Denver, in the county of Arapahoe and State of Colorado, have invented certain new and useful Improvements in Collar or Cuff Buttons or Studs; and I do declare the following to be a full, clear, and exact description of the invention, such as will enable others skilled in the art to which it appertains to make and use the same, reference being had to the accompanying drawings, and to the letters of reference marked thereon, which form a part of this specification.

My invention relates to collar and cuff buttons and studs, and the objects of my invention are, first to provide a collar and cuff button which can be easily and quickly fastened and unfastened; second to provide a collar or cuff button or stud with a base and a hollow shank formed integral with it and a stem secured to it with an elastic reciprocal connection arranged to slide perpendicularly in the shank, and a head or cap pivoted to the outward extremity of the stem and arranged to turn on its pivot and lock itself parallel with the stem. This combination allows the head when the stem is pulled out to be swung around in a vertical position, making it easy to fasten and unfasten it to and from collars and cuffs. I attain these objects by the mechanism illustrated and described in the accompanying drawings and specifications, in which—

Figure 1 represents a sectional view through the center of my improved collar, cuff, and stud button. Fig. 2 represents in section a modification of my improved combination button. Fig. 3 represents a sectional view of the button in a fragment of a collar with the stem extended and the head in a vertical position to unbutton from the collar. Fig. 4 represents a detail of the stem. Fig. 5 represents a perspective of the head. Fig. 6 represents an elevation of a stud embodying my improved extension stem.

Similar letters of reference refer to similar parts throughout the several views.

Referring to Fig. 1, A. designates the base of the button; B. designates the shank which preferably forms a part of it. In the shank and base I form a hole C. large enough to contain the stem D. and also a coiled spring E. or a coiled conical spring F. I show this spring made of round wire but it can be made of ribbon wire or clock spring. The conical spring however, when folded or compressed takes up less room and enables me to make a more compact button.

The hole C. is contracted at the outer extremity C' of the shank to fit the stem D., and the lower end G. of the stem is enlarged to fit the larger hole C. in the base and lower part of the shank and also to form a shoulder for the spring E. which is arranged around the stem in the hole and expansively contacts with it. I also form a cup-shaped recess P in the top of the shank for the lower edge of the head Q to rest in when it is in a vertical position, as shown in Fig. 3. I form a slot H'. centrally in the outer extremity of the stem for the reception of the lug H. which is pivoted in it by the pivot I.

In Fig. 1 I show a head on the end of the stem D. This form gives more metal with which to make the connection with the head. Upon one or both sides of the lug I secure a spring K. which has formed at its extremity an arc shaped curve which extends downwardly from the head and body of the spring and fits into a recess L. which is formed in the ends D' and D² of the stem to receive it.

When the head rests normal to the stem it is locked in that position by the spring which impinges in the recess L. and holds it. I also form two recesses M. and N. one on each side of the pivot I. arranging them horizontally with its axis. I curve the ends of the stem and also form a counter curve at the base of the lug H. so that the head may fit the ends and move freely in either direction around them until it attains a vertical position, when the spring impinges in one of the recesses N. or M. and locks it in that position.

In order that the spring may have room to recede away from the ends D' and D² of the stem when moved out of the recess by the movement of the head around them, I form a recess or pocket O. in the under side of head which allows it to move back.

In Fig. 3 I show the stem drawn out from the shank far enough to swing the head in a vertical position. It then rests on top of the shank in the recess P and is held tightly against it by the expansive power of the spring F. It is then easily withdrawn from the button-holes of the fragmentary collar R shown. To button a collar or cuff the head is turned to a vertical position and inserted in the button-holes. The stem is then drawn out from the shank from the other side of the collar or cuff until the head will swing clear of the button hole, thus avoiding unduly tearing or stretching them, and buttoning them easily and quickly.

Having described my invention, what I claim as new, and desire to secure by Letters Patent, is—

1. The combination in a collar or cuff button or stud of a base and a shank provided with a recess; of a stem extensibly connected with a yielding reciprocal connection in said recess and provided with a bifurcated outer end of a button head provided with a lug fitting the bifurcation of the stem and pivoted therein; of a spring secured to said head and arranged to bear in recesses formed on the periphery of the rounded end of the stem at the perpendicular and horizontal axis of its pivot; of a cup-shaped recess in the top of said shank adapted to receive the lower edge of the head when it occupies a vertical position, as herein specified.

2. The combination in a cuff or collar button or stud of base and shank, having a recess formed therein, of a stem yieldingly secured by a coiled cylindrical or conical spring arranged around said stem to impinge against the bottom of said cavity and a shoulder formed on said stem; of a head provided with a lug; of a spring secured to said head and a recess formed in the head for it to recede into; of a slot formed centrally in the end of the said stem for the reception of the said lug and a pivot connecting the stem and head together and having curved ends on the stem radiating from the pivot of a concentric curve at the base of the lug adapted to allow the head to contact with and turn on the curved ends of the stem and having arc shaped recess in one or both of the curved ends of the stem adjacent to the spring and arranged in line with the vertical and horizontal axis of said pivot; of a cupped shaped recess in the top of said shank surrounding said stem adapted to receive the lower edge of the head when it is turned around parallel with said stem, as set forth and described.

In testimony whereof I affix my signature in presence of two witnesses.

THOMAS W. JONES.

Witnesses:
F. M. TUCKER,
WALTER D. BURNHAM.